(12) United States Patent
Kato

(10) Patent No.: US 9,821,642 B2
(45) Date of Patent: Nov. 21, 2017

(54) BACKDOOR STRUCTURE FOR VEHICLE

(71) Applicant: KABUSHIKI KAISHA TOYOTA JIDOSHOKKI, Kariya-shi, Aichi-ken (JP)

(72) Inventor: Junya Kato, Kariya (JP)

(73) Assignee: KABUSHIKI KAISHA TOYOTA JIDOSHOKKI, Kariya-Shi (JP)

( * ) Notice: Subject to any disclaimer, the term of this patent is extended or adjusted under 35 U.S.C. 154(b) by 0 days.

(21) Appl. No.: 15/501,191

(22) PCT Filed: Jul. 23, 2015

(86) PCT No.: PCT/JP2015/070942
§ 371 (c)(1),
(2) Date: Feb. 2, 2017

(87) PCT Pub. No.: WO2016/024469
PCT Pub. Date: Feb. 18, 2016

(65) Prior Publication Data
US 2017/0225548 A1    Aug. 10, 2017

(30) Foreign Application Priority Data

Aug. 11, 2014 (JP) .................................. 2014-163431

(51) Int. Cl.
*B60J 5/00* (2006.01)
*B60J 5/10* (2006.01)
(Continued)

(52) U.S. Cl.
CPC ................. *B60J 5/107* (2013.01); *B60J 1/18* (2013.01); *B62D 35/007* (2013.01)

(58) Field of Classification Search
CPC .............. B60J 5/02; B60J 1/18; B62D 35/007
(Continued)

(56) References Cited

U.S. PATENT DOCUMENTS 4,417,760 A * 11/1983 Koch ................... B62D 35/007
296/180.1
4,615,931 A * 10/1986 Matsuyoshi ............. B60J 1/008
296/106

(Continued)

FOREIGN PATENT DOCUMENTS

JP    2-117213 U1    9/1990
JP    5-004520 A     1/1993
(Continued)

OTHER PUBLICATIONS

English Translation of International Preliminary on Patentability Report, issued by the International Searching Authority in application No. PCT/JP2015/070942.

(Continued)

*Primary Examiner* — Joseph D Pape
(74) *Attorney, Agent, or Firm* — Sughrue Mion, PLLC

(57) ABSTRACT

A backdoor structure for a vehicle, the backdoor structure comprising an upper window and a lower window, a rear spoiler disposed between the windows and projecting toward the rear of the vehicle, a backdoor frame supporting both windows and the rear spoiler, and a resin panel, wherein the resin panel comprises a window portion functioning as the lower window and a spoiler portion functioning as the rear spoiler, the window portion and the spoiler portion being integrated by resin molding.

3 Claims, 2 Drawing Sheets

(51) Int. Cl.
 *B60J 1/18* (2006.01)
 *B62D 35/00* (2006.01)

(58) Field of Classification Search
 USPC .................................. 296/146.8, 76, 180.1
 See application file for complete search history.

(56) References Cited

U.S. PATENT DOCUMENTS

| | | | | |
|---|---|---|---|---|
| 5,172,954 | A * | 12/1992 | Yamazaki | B62D 35/007 296/180.1 |
| 5,356,195 | A * | 10/1994 | Kanda | B62D 35/007 296/146.8 |
| 5,415,453 | A * | 5/1995 | Huber | B60S 1/0402 15/250.16 |
| 2002/0021022 | A1* | 2/2002 | Erdelitsch | B62D 35/007 296/180.1 |
| 2011/0241376 | A1* | 10/2011 | Igura | B60J 5/101 296/146.3 |
| 2015/0217491 | A1* | 8/2015 | Syvret | B29C 70/46 296/180.1 |
| 2016/0303954 | A1* | 10/2016 | Kawashima | B62D 35/007 |

FOREIGN PATENT DOCUMENTS

| | | |
|---|---|---|
| JP | 2009-067360 A | 4/2009 |
| JP | 2013-199187 A | 10/2013 |

OTHER PUBLICATIONS

International Search Report for PCT/JP2015/070942 dated Oct. 13, 2015 [PCT/ISA/210].

* cited by examiner

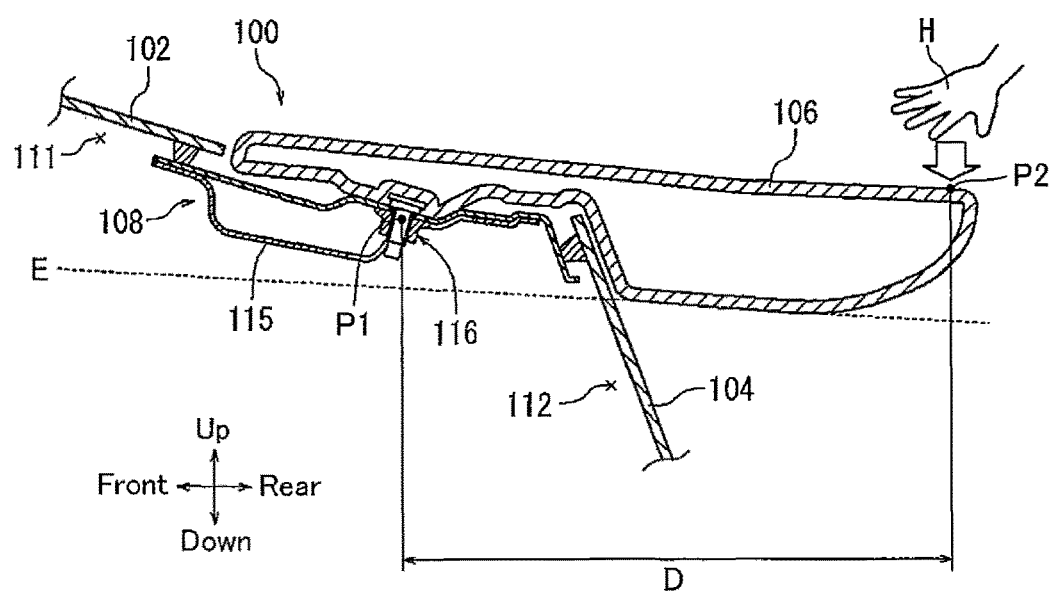

BACKDOOR STRUCTURE FOR VEHICLE

CROSS REFERENCE TO RELATED APPLICATIONS

This application is a National Stage of International Application No. PCT/JP2015/070942, filed on Jul. 23, 2015, which claims priority from Japanese Patent Application No. 2014-163431, filed on Aug. 11, 2014, the contents of all of which are incorporated herein by reference in their entirety.

TECHNICAL FIELD

The present invention relates to a back door structure for a vehicle.

BACKGROUND ART

There is a type of vehicle back door structure that includes an upper window, lower window, and a rear spoiler located between the two windows. A prior art example of such a vehicle back door structure will now be described. FIG. 3 is a cross-sectional view of a back door showing a portion where a rear spoiler is located. As shown in 3, a back door 100 includes an upper window 102, a lower window 104, rear spoiler 106 located between the two windows 102 and 104, and a back door frame 108 that supports the two windows 102 and 104 and the rear spoiler 106. The back door 100 is of a type that swings upward and opens and closes a back door opening of a vehicle (not shown).

The back door frame 108 includes a window frame that defines upper and lower window openings 111 and 112. As shown FIG. 3, the window frame includes a partition 115 that partitions the two window openings 111 and 112. The upper window 102 is attached to the back door frame 108 so as to seal the upper window opening 111. The lower window 104 is attached to the back door frame 108 so as to seal the lower window opening 112. The rear spoiler 106, which is formed from a resin, is formed as a hollow structure having a low profile in the vertical direction of the vehicle. The rear spoiler 106 is fastened to the back door frame 108 by bolts and nuts 116. The rear spoiler 106 projects toward the rear of the vehicle.

Patent document 1 describes a vehicle back door structure including a resin panel formed by resin-molding and integrating a window and a rear spoiler located above the window.

PRIOR ART DOCUMENT

Patent Document

Patent Document 1: Japanese Laid-Out Patent Publication No. 2009-67360

SUMMARY OF THE INVENTION

Problem to be Solved by the Invention

In the prior art example shown in FIG. 3, the lower window 104 and the rear spoiler 106 are separately attached to the back door frame 108. This increases the weight of the back door 100. The rear spoiler 106, which is located between the two windows 102 and 104, may be pushed by a hand H when closing the back door 100. In FIG. 3, the portion of the rear spoiler 106 where the bolt and the nut 116 are fastened is indicated as a fixed point P1, and the rear end of the rear spoiler 106 where a lowering load is applied by the hand H is indicated as an input point P2. In this case, the distance D from the fixed point P1 to the input point P2 is long. Thus, the rear spoiler 106 is apt to bend and deform. This may give the rear spoiler 106 a low-rigidity feel and adversely affect the product characteristics of the door 100. The rear spoiler 106 may have a higher rigidity when increasing the thickness of the rear spoiler 106. However, an increase in the thickness of the rear spoiler 106 will further increase the weight of the back door 100. Further, this will block the line of sight E of the driver and interfere with the rear field of view of the driver. Thus, the thickness increase is not a practical solution.

In patent document 1, the rear spoiler is located at the upper side of a window, and a window does not exist at the upper side of the rear spoiler. That is, the rear spoiler is located near the upper end of the back door. Thus, the likelihood of the rear spoiler being pushed by a hand is low.

It is an object of the present invention to provide a vehicle back door structure that decreases the weight of the back door and improves the rigid feel of the rear spoiler.

Means for Solving the Problem

A vehicle back door structure that solves the above problem includes an upper window and a lower window. The vehicle back door structure further includes a rear spoiler located between the two windows. The rear spoiler projects toward the rear of a vehicle. The vehicle back door structure further includes a back door frame that supports the two windows and the rear spoiler. The vehicle back door structure further includes a resin panel including a window portion that functions as the lower window and a spoiler portion that functions as the rear spoiler. The window portion and the spoiler portion are resin-molded and integrated together.

BRIEF DESCRIPTION OF THE DRAWING

FIG. 3 is a cross-sectional view showing a portion where a rear spoiler is located in a prior art example of a back door.

EMBODIMENTS OF THE INVENTION

Figure 1:
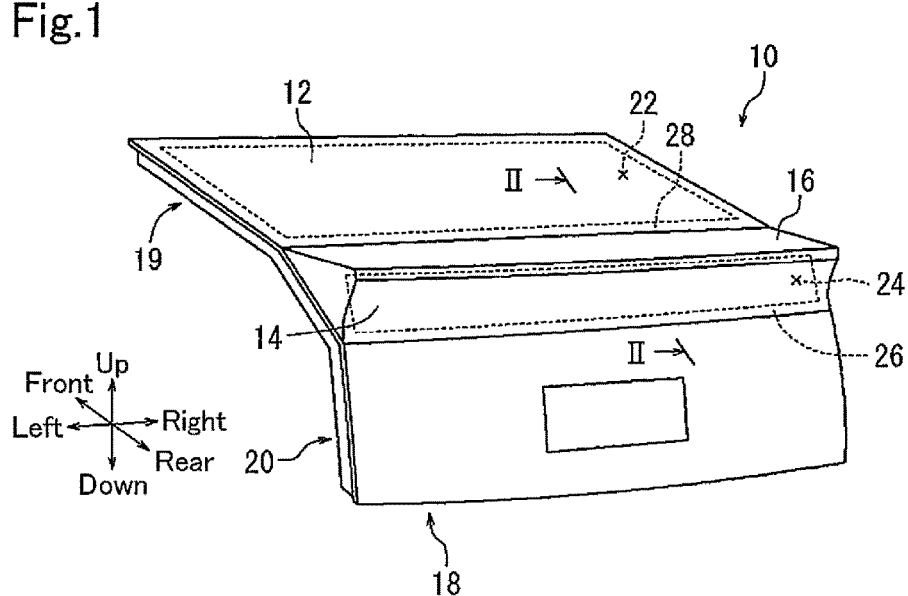
FIG. 1 is a perspective view showing one embodiment of a back door.
Figure 2:
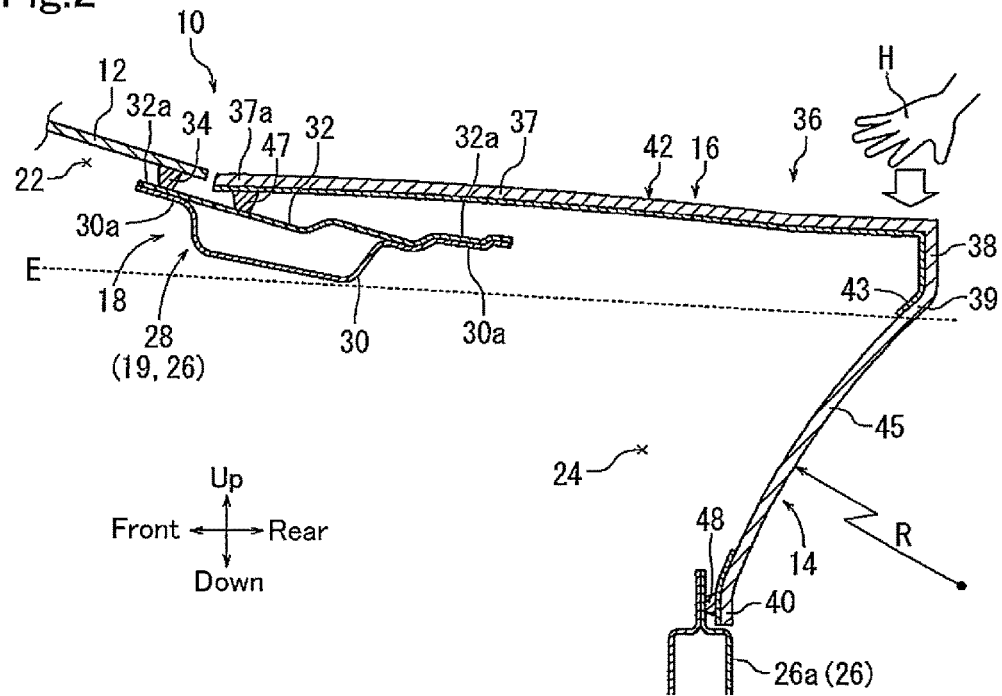
FIG. 2 is a cross-sectional view taken along line II-II in FIG. 1.

One embodiment of the present invention will now be described with reference to the drawings. FIG. 1 is a perspective view showing a back door, and FIG. 2 is a cross-sectional view taken along line II-II in FIG. 1. The frame of reference for the directions indicated in the drawings is the front-rear direction of the vehicle. As shown in FIGS. 1 and 2, a back door 10 includes an upper window 12, a lower window 14, a rear spoiler 16, and a back door frame 18. The rear spoiler 16 is located between the two windows 12 and 14. The back door frame 18 supports the two windows 12 and 14 and the rear spoiler 16. The back door 10 is of a type that swings upward and opens and closes a back door opening of a vehicle (not shown). The upper window 12 corresponds to the rear window of a typical back door. The lower window 14 corresponds to a window that enlarges the rear sight of view of the driver, namely, an extra window.

As shown in FIG. 1, the back door frame 18 has a reverse-L-shaped form in a side view of the vehicle. The back door frame 18 includes a rectangular upper frame portion 19, which extends diagonally downward and toward the rear of the vehicle, and a rectangular lower frame portion 20, which extends downward from the rear end of the upper frame portion 19. The upper frame portion 19 includes a rectangular upper window opening 22. The upper frame portion 19 functions as an upper window frame that surrounds the upper window opening 22. The lower frame portion 20 includes an upper part that defines a rectangular lower window opening 24. The lower frame portion 20 includes a lower window frame 26 that surrounds the lower window opening 24. A partition 28 that partitions the two window openings 22 and 24 is arranged between the upper frame portion 19 and the lower frame portion 20. The partition 28 functions as the lower part of the upper window frame 19 and the upper part of the lower window frame 26. The partition 28 extends in the lateral direction of the vehicle.

As shown in FIG. 2, the partition 28 includes an inner panel 30 and an outer panel 32. The partition 28 is tubular and box-shaped and has a closed cross-sectional structure obtained by joining two flanges 30a of the inner panel 30 with two flanges 32a of the outer panel 32. Portions of the window frame other than the partition 28 are also tubular and box-shaped and have a closed cross-sectional structure in the same manner as the partition 28. The inner panel 30 is the lower portion of the partition 28, and the outer panel 32 is the upper portion of the partition 28.

The upper window 12 has the form of a rectangular plate and is formed by a glass or resin plate that is transparent. The upper window 12 is attached to the upper frame portion 19 from the outside of the passenger compartment so as to seal the upper window opening 22. The peripheral portion of the upper window 12 is adhered by an adhesive 34 to the upper frame portion 19. Thus, the upper window 12 extends diagonally downward and toward the rear of the vehicle.

The lower window 14 and the rear spoiler 16 are resin-molded and integrated into a single resin panel 36. More specifically, the resin panel 36 is an integrated molded product including a window portion that functions as the lower window 14 and a spoiler portion that functions as the rear spoiler 16. The resin panel 36 has a cross-sectional shape that is generally uniform in the lateral direction of the vehicle. A sheet of a panel material having the form of a rectangular plate is bent in a sideways V-shaped manner to form the resin panel 36 that opens toward the front as viewed from the side of the vehicle. The resin panel 36 includes an upper wall portion 37, a rear wall portion 38, a rear surface wall 39, and a lower flange 40. The upper wall portion 37 extends horizontally in the front-rear direction and includes a front end that defines a front flange 37a. The rear wall portion 38 extends downward from the rear end of the upper wall portion 37. The rear surface wall 39 extends diagonally downward and toward the front from the lower end of the rear wall portion 38. The lower flange 40 extends downward from the lower end of the rear surface wall 39. The upper wall portion 37 and the rear wall portion 38 form the rear spoiler 16, namely, the spoiler portion 16. The lower flange 40 and the rear surface wall 39 form the lower window 14, namely, the window portion 14.

The resin panel 36 includes a panel body 42 and a shield 43. The shield 43 is formed integrally with the reverse side of the panel body 42, that is the passenger compartment side surface of the panel body 42. The panel body 42 includes the upper wall portion 37, the rear wall portion 38, the rear surface wall 39, and the lower flange 40. The panel body 42 is formed from a transparent resin material such as a polycarbonate resin or an acrylic resin. The shield 43 is formed from a black resin material having a shielding characteristic. The shield 43 is formed in a laminated manner on the reverse side of the spoiler portion 16 and the reverse side of the peripheral portion of the window portion 14. The resin panel 36 is formed through two-color molding including a step of forming the panel body 42 by injection-molding a transparent resin material and a step of forming the shield 43 by injection-molding black resin material onto the panel body 42. The shield 43 blackens the spoiler portion 16 and the peripheral portion of the window portion 14. The transparent region of the rear surface wall 39, that is, the region that is not covered by the shield 43, is referred to as the transparent wall 45.

The resin panel 36 is attached to the lower window frame 26 so as to seal the lower window opening 24 from the outside of the passenger compartment and surround the rear region of the lower window opening 24. The front flange 37a is adhered by an adhesive 47 to the partition 28. The front flanges 37a is in alignment with and located proximate to the rear end (lower end) of the upper window 12. The lower flange 40 is adhered by an adhesive 48 to a lower portion 26a of the lower window frame 26. Although not shown in the drawings, the remaining peripheral portion of the resin panel 36 is formed in correspondence with the lower window frame 26 of the back door frame 18 and adhered by an adhesive to the lower window frame 26.

The spoiler portion 16 projects toward the rear of the vehicle. The front part of the upper wall portion 37 is located above the partition 28 and covers the partition 28. The window portion 14 corresponds to the lower window opening 24 at the rear of the lower window opening 24. The transparent wall 45 is formed taking into consideration the position of the partition 28 so that the line of sight E of the driver is not blocked.

The rear surface wall 39 is a curved wall and has an arcuate cross-section that is recessed toward the front in a side view of the vehicle. The rear surface wall 39 has a radius of curvature R that does not interfere with the rear field of view of the driver. The radius of curvature R is set to, for example, 450 mm or larger. As the radius of curvature R increases, the curve of the rear surface wall 39 will be more gradual. When the radius of curvature R is smaller than 450 mm, refraction of the transmitted light greatly distort the view. Thus, it is preferred that the radius of curvature R of the rear surface wall 39 (more specifically, the transparent wall 45) be 450 mm or larger to reduce view distortion of the rear surface wall 39. The function of the window portion 14 would be adversely affected when the rear surface wall 39 greatly distorts the view of the rear of the vehicle that is seen by the driver through the rear surface wall 39. In this specification, the phrase of "radius of curvature that does not interfere with the rear field of view of the driver" refers to a radius of curvature that does not adversely affect the function of the window portion 14.

In the vehicle back door structure, the lower window (window portion) 14 and the rear spoiler (spoiler portion) 16 are integrated. Thus, compared to when the lower window and the rear spoiler are separate, the weight of the back door 10 can be decreased. With the integration of the window portion 14 and the spoiler portion 16, the window portion 14 directly supports the spoiler portion 16. Thus, when pushing the spoiler portion 16 with a hand H to close the back door 10, the window portion 14 receives the load applied to the spoiler portion 16. This reduces bending deformation of the spoiler portion 16 and improves the rigid feel of the spoiler portion 16. Consequently, the product characteristics of the back door 10 are improved. The spoiler portion 16 is located directly behind or substantially behind the partition 28. Thus, the rear field of view of the driver is not interfered with.

The window portion 14 includes the rear surface wall 39 that has an arcuate cross-section and is recessed toward the front in a side view of the vehicle. Accordingly, the window portion 14 improves the support rigidity of the spoiler portion 16. The rear surface wall 39 is continuous with the rear end of the spoiler portion 16, that is, the lower end of the rear wall portion 38. Thus, the window portion 14 effectively improves the support rigidity of the spoiler portion 16.

The rear surface wall 39 is formed with a radius of curvature R that does not interfere with the rear field of view of the driver. This reduces the view distortion of the rear surface wall 39 and improves the rear field of view of the driver.

Further Embodiments

The present invention is not limited to the above embodiment and may be modified within the scope without departing from the spirit of the present invention. For example, the location where the resin panel 36 is joined with the partition 28 may be changed. The cross-sectional shape of the spoiler portion 16 may be changed. For example, the rear wall portion 38 may be omitted, and the upper end of the window portion 14 may be connected to the rear end of the upper wall portion 37. A horizontal lower wall portion may be formed between the lower end of the rear wall portion 38 and the upper end of the window portion 14. The cross-sectional shape of the window portion 14 may be changed. For example, the rear surface wall 39 may have a cross-section that is sideways U-shaped and is recessed toward the front as viewed from the side of the vehicle. The rear surface wall 39 may have a cross-section that is sideways V-shaped and is recessed toward the front as viewed from the side of the vehicle. The rear surface wall 39 may have a linear cross-section that extends diagonally downward and toward the front of the vehicle as viewed from the side of the vehicle. Only a portion of the rear surface wall 39 may be a curved wall. For example, an upper portion of the rear surface wall 39, a lower portion of the rear surface wall 39, or a middle portion of the rear surface wall 39 may be a curved wall. The entire transparent wall 45 or a portion of the transparent wall 45 may be a curved wall. The spoiler portion 16 may be formed from a colored resin material. The shield 43 may be of a color other than black. The shield 43 may be a layer of a colored paint. The shield 43 need only be provided when necessary and may be omitted.

The invention claimed is:

1. A vehicle back door structure comprising:
   an upper window and a lower window;
   a rear spoiler located between the two windows, wherein the rear spoiler projects toward a rear of a vehicle;
   a back door frame that supports the two windows and the rear spoiler; and
   a resin panel including a window portion that functions as the lower window and a spoiler portion that functions as the rear spoiler, wherein the window portion and the spoiler portion are resin-molded and integrated together, wherein
   the window portion of the resin panel includes a curved wall having an arcuate cross-section that is recessed toward a front of the vehicle in a side view of the vehicle,
   the spoiler portion of the resin panel includes an upper wall portion extending in a front-rear direction and a rear wall portion extending downward from a rear end of the upper wall portion,
   the curved wall of the window portion is continuous with a lower end of the rear wall portion of the spoiler portion, and
   the resin panel is connected to the back door frame only at a peripheral portion of the resin panel that includes a front end of the spoiler portion and a lower end of the window portion.

2. The vehicle back door structure according to claim 1, wherein the curved wall is formed to have a radius of curvature that does not interfere with a rear field of view of a driver.

3. The vehicle back door structure according to claim 1, wherein the curved wall has a radius of curvature of 450 mm or larger.

* * * * *